(No Model.) 2 Sheets—Sheet 1.
D. R. ELLIS.
OIL FILTER.

No. 410,319. Patented Sept. 3, 1889.

Witnesses
Wm. F. Heming
Louis M. Whitehead

Inventor
David R. Ellis (No Model.) 2 Sheets—Sheet 2.
D. R. ELLIS.
OIL FILTER.
No. 410,319. Patented Sept. 3, 1889.
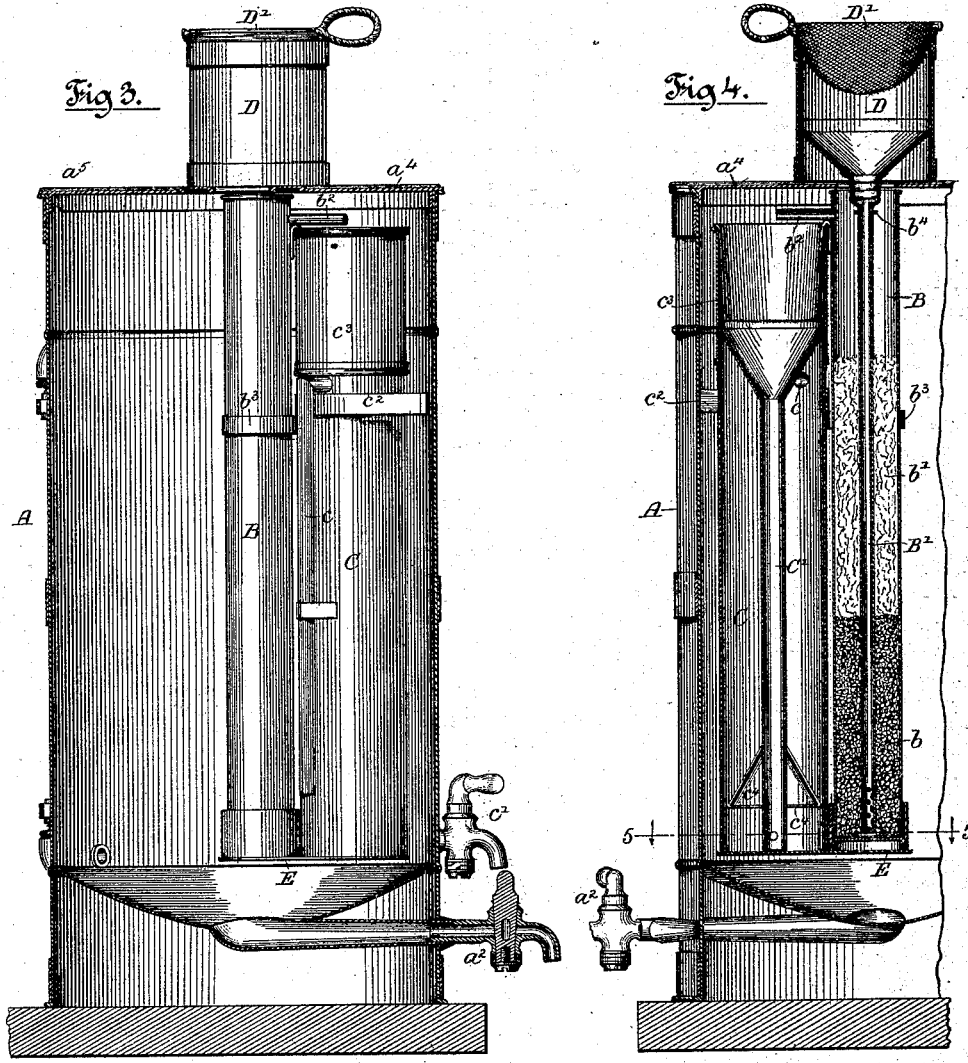
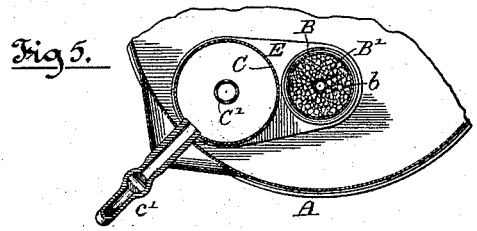
Witnesses
Wm. T. Henning
Louis M. Whitehead
Inventor
David R. Ellis

UNITED STATES PATENT OFFICE.

DAVID R. ELLIS, OF CHICAGO, ILLINOIS.

OIL-FILTER.

SPECIFICATION forming part of Letters Patent No. 410,319, dated September 3, 1889.

Application filed February 28, 1889. Serial No. 301,515. (No model.)

*To all whom it may concern:*

Be it known that I, DAVID R. ELLIS, of Chicago, in the county of Cook and State of Illinois, have invented certain new and useful Improvements in Oil-Filtering Apparatus; and I do hereby declare that the following is a full, clear, and exact description thereof, reference being had to the accompanying drawings, and to the letters of reference marked thereon, which form a part of this specification.

This invention relates to a combined tank and filter for oil, being intended more especially for the filtration of oil for lubricating purposes.

The invention has for its object to provide an apparatus of a simple construction, capable of prompt and continuous operation and adapted to be conveniently cleansed.

The invention comprises several features of improvement, which will be understood from the following description of the accompanying drawings, and which are pointed out in the appended claims.

Figure 1:
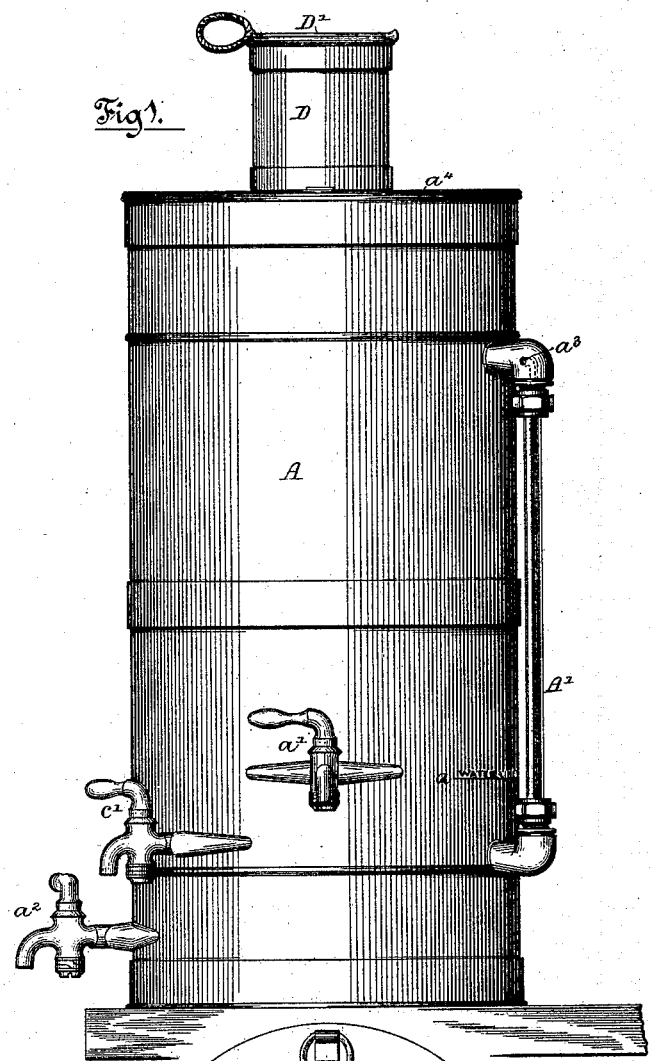
Figure 2:
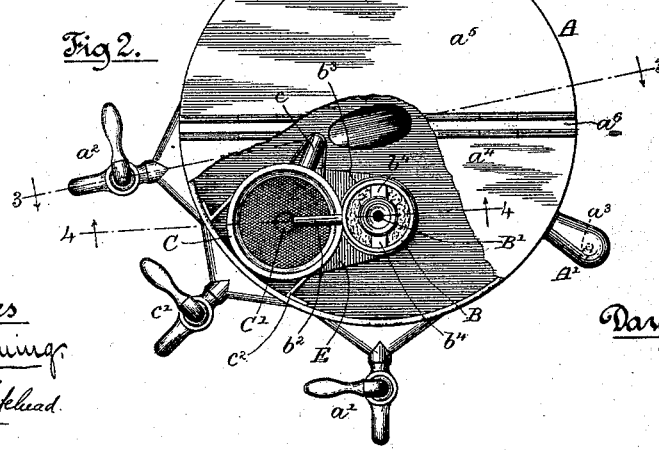

In the said drawings, Figure 1 is a side elevation of the tank and filter. Fig. 2 is a top view with a portion of the cover removed. Fig. 3 is a central vertical section in the plane of the line 3-3 of Fig. 2. Fig. 4 is a fragmentary vertical section in the line 4 4 of Fig. 2, being a central vertical section of the interior tubes of the apparatus. Fig. 5 is a horizontal section in the line 5 5 of Fig. 4.

A represents a cylindric tank, intended to contain a body of water and the filtered oil upon the water, the proper level of the water being indicated by the permanent line marked on the exterior surface of the tank. Just above this water-line is located a faucet $a'$, for drawing off the oil, and with the extreme bottom of the tank is connected a second faucet $a^2$, for drawing off sediment which may accumulate therein. The tank is provided with a water glass or gage A', extending from a point below the water-line $a$ to any desired height. This glass is not intended to communicate with the body of oil in the tank, but communicates at the top with the atmosphere, either without the tank or within the same above the highest level which the oil shall reach. Such communication with the air is indicated by the orifice $a^3$, opening from the glass through the upper fitting or support of said glass.

The tank is provided with a suitable cover, here shown as consisting of two half-lids $a^4 a^5$, hinged to a central cross-bar $a^6$.

Within the tank A are two vertical tubes B and C, and within each of these tubes is a smaller tube, marked B' and C', respectively. Both the tubes B and C extend to or nearly to the bottom of the tank A, and the inner tubes B' and C' extend to or nearly to the bottoms of the tubes B and C, communicating with the latter through suitable perforations or equivalent openings at their lower ends.

Within the tube B and around the tube B' are placed suitable filtering materials. In this instance $b$, Fig. 4, may indicate a body of charcoal occupying the lower third or half of this annular space, and $b'$ a quantity of cotton placed above the charcoal and extending nearly to the top of the tube. The inner tube B' has a suitable funnel D at its upper end, which is preferably detachable, and may be either within or outside the tank, but which is shown in the present instance as exterior thereto and connecting removably with the tube B' through a hole in the top of the half-lid $a^4$. Within this funnel D is removably placed a strainer D'. Near the top of the tube B the latter has a spout or overflow-pipe $b^2$, having its open outer end arranged over the mouth or upper open end of the tube C'. The tube C has a discharge-pipe $c$, leading from a point near its upper end to a point near the bottom of the tank, or below the water-line $a$.

In this construction impure oil poured through the strainer D' and funnel D into the tube B' passes to the bottom of the latter and out through the communicating openings into the bottom of the outer tube B. From this point it rises through the filtering material and, being more or less completely cleansed thereby, passes out through the spout $b^2$ into the tube C'. The outer tube C is supplied with a quantity of water, and the oil passing down through the tube C' enters the tube C through the bottom openings of the former, and, rising through the water to the height of the pipe $c$, is conducted thereby to the lower part or water-space of the tank A. Rising through the water in said tank it accumulates on the surface thereof to any extent to which it may be supplied at the inlet-funnel, and is drawn off as wanted at the faucet $a'$. The oil is further clarified in its passage through the water and is practically pure when it has reached the water-surface in the main chamber of the tank.

A faucet $c'$ leads from the bottom of the tube C, by means of which the sediment may be withdrawn therefrom.

The tube B is made removable from the tank A for the purpose of conveniently changing the filtering material therein, and for its support while in the tank the stationary eye or ring $b^3$ is provided for its middle or upper portion, while its lower portion is sustained by a plate E, attached to the lower end of the fixed tube C. The tube C at its lower end and this plate E are sustained in place by rigid connection with the pipe leading from the bottom of said tube C to the faucet $c'$. The upper part of the tube C is steadied, as shown, by the yoke $c^2$, fastened to the wall of the tank.

Both the tubes C' and B' are shown detachable from the tubes C and B to facilitate the cleansing, and are suitably supported within the said outer tubes by any appropriate means. In the case of the tube B' it is accomplished by means of cross-bars $b^4$, attached to the interior walls of the outer tube B, and having central eyes or passages for the inner tube. In the case of the inner tube C' this is accomplished by means of the funnel-shaped top $c^3$ thereof, which fills the top of the outer tube C, and the fixed arms $c^4$, attached to the lower end of said inner tube.

It is manifest that if less complete clarification is permissible the tube C and its contained parts may be omitted and that in that case the discharge or overflow pipe $b^2$, leading from the tube B, may be extended downward to conduct the oil directly from said tube to the bottom of the tank A, as now does the corresponding pipe $c$, leading from the tube C.

It will be observed that the water-glass shows only water, but that the surface of the water in said glass will nevertheless indicate the height, or substantially the height, of the oil within the tank, if the tank be first supplied with water to the water-line $a$, the difference between this mark and the higher level of the water in the glass representing the amount of oil in the tank. The water-line $a$ should be sufficiently above the connection of the water-glass at its lower end with the interior of the water-space of the tank to prevent the passage of oil into the glass under any proper use of the filter.

I claim as my invention—

1. The combination of the tank A, filter-tube B within the tank, oil-supply tube B', and a conduit or conduits leading from the top of the tube B to the lower part of the tank A for conducting the oil which rises through the filtering material in said tube B to a point below the water-line in the tank.

2. The combination, with a tank A, filter-tube B, supply-tube B', and filtering material occupying the space between the tubes B and B', of a second tube C, its interior open-bottomed tube C', the pipe delivering from the upper end of the tube B in the top of the tube C' and that leading from the top of the tube C to a point below the water-line of the tank, substantially as described.

3. The combination, with the tank A, tubes B and C, the interior tubes B' and C', and the pipe leading from the tube B to the tube C', of the pipe leading from the tube C to a point in the tank A below the water-line thereof, and the external faucet leading respectively from the bottom of the tube B, from the bottom of the tank A, and from the tank A above the water-line, substantially as described.

In testimony that I claim the foregoing as my invention I affix my signature in presence of two witnesses.

DAVID R. ELLIS.

Witnesses:
C. CLARENCE POOLE,
GEO. W. HIGGINS, Jr.